United States Patent
Chen et al.

(10) Patent No.: US 6,300,267 B1
(45) Date of Patent: Oct. 9, 2001

(54) HIGH DIELECTRIC CONSTANT BURIED CAPACITORS WITH EXTENDED OPERATING TEMPERATURE RANGES

(75) Inventors: Hung-tse Daniel Chen, Cranbury; Barry Jay Thaler, Lawrenceville, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/434,059

(22) Filed: Nov. 4, 1999

Related U.S. Application Data

(60) Provisional application No. 60/107,098, filed on Nov. 5, 1998.

(51) Int. Cl.[7] .............................. C09D 11/00; H01G 4/10; C04B 35/26
(52) U.S. Cl. .................. 501/135; 501/136; 252/62.9; 361/274.1; 361/312; 361/321.4; 106/31.92
(58) Field of Search ................................. 501/135, 136; 252/62.9 PZ; 361/274.1, 312, 321.4; 106/31.92

(56) References Cited

U.S. PATENT DOCUMENTS

| | | | |
|---|---|---|---|
| 4,482,935 | * 11/1984 | Wheeler | 361/321 |
| 5,004,715 | 4/1991 | Hakotani et al. . | |
| 5,032,558 | * 7/1991 | Bailey et al. | 501/137 |
| 5,337,209 | 8/1994 | Sutherland et al. . | |
| 5,345,139 | * 9/1994 | Gururaja et al. | 310/358 |

* cited by examiner

Primary Examiner—David Brunsman
(74) Attorney, Agent, or Firm—William J. Burke

(57) ABSTRACT

Various mixtures of lead magnesium niobate and lead titanate are made, each mixture having a different Curie temperature, wherein these mixtures are mixed together to form capacitor inks that can be used to make capacitors embedded in multilayer ceramic circuit boards. These capacitors have extended temperature ranges of operation as well as low loss tangents and high dielectric constants.

12 Claims, 2 Drawing Sheets

HIGH DIELECTRIC CONSTANT BURIED CAPACITORS WITH EXTENDED OPERATING TEMPERATURE RANGES

This application claims priority from Provisional application Ser. No. 60/107,098 filed Nov. 5, 1998.

This invention was made with Government support under Contract No. F33615-96-2-5105. The Government has certain rights in this invention.

This invention relates to high dielectric constant capacitors having extended operating temperature ranges and low temperature coefficient of capacitance (TCC) that are embedded in multilayer ceramic printed circuit boards.

BACKGROUND OF THE INVENTION

Low temperature firing multilayer ceramic circuit boards are known that are suitable for use with low melt temperature conductive metals, such as silver, gold and copper. They have a low thermal coefficient of expansion (TCE) and they may be formulated to be compatible with both silicon and gallium arsenide devices.

These ceramic circuit boards are made from glasses that can be fired at low temperatures of less than 1000° C. The circuit boards are made by admixing finely divided selected glass particles or powders, and optional inorganic fillers, with an organic vehicle including resin, solvents, dispersants and the like. The resultant slurry is cast as a thin tape, called green tape. A circuit pattern may be screen printed onto the green tape using a conductive ink formulation of a conductive metal powder, e.g., of silver, an organic vehicle and a powdered glass, generally the same glass as that used to make the green tape.

A plurality of green tapes having printed circuits thereon can be stacked together. In such case, via holes are punched into each green tape and the vias are filled with a conductive via fill ink to connect the circuits electrically. The green tapes are then aligned, laminated under heat and pressure and then fired to remove the organic materials and to vitrify the glass. Recently the green tapes have been supported on a metal support substrate to add mechanical strength to the fired green tape stack. An added advantage to this improvement is that bonding glasses used to adhere the green tape stack to the support substrate have been found to reduce shrinkage of the green tapes in the x and y dimensions. Thus almost all of the shrinkage occurs in the z dimension and thus reduces the tolerances required between the various circuits and contacts.

More recently, embedded components, such as capacitors and resistors, have been made by screen printing capacitor or resistor inks on green tapes within a green tape stack and firing all of the stacked green tapes and component layers together. This eliminates the need for mounting discrete components on the ceramic circuit boards, and reduces the space requirements for components on the green tapes.

Lead magnesium niobate (PMN) has been used to make capacitor inks. However, since PMN alone has a high firing temperature, useful capacitor inks based on PMN, must include a sintering aid to reduce the firing temperature of the mixture to below about 900° C.

However, the dielectric properties of PMN-based capacitors are highly dependent on temperature. FIG. 1 illustrates the dramatic change in dielectric permittivity for PMN with temperature over the temperature range of 20–140° C., measured at 10 KHz. FIG. 1 shows that the permittivity of PMN decreases steadily with an increase in temperature. As shown in FIG. 2, the loss tangent of buried capacitors made with PMN falls rapidly between 20–60° C. and continues to decline thereafter as the temperature increases. However, the dielectric constant of these capacitors is generally quite high, which is very desirable. Thus a method of reducing the temperature dependence of PMN dielectric properties while retaining their high dielectric constant, would be highly desirable.

SUMMARY OF THE INVENTION

We have found that by melting a relaxor ferroelectric material, such as lead magnesium niobate, with other ferroelectric powders, including lead titanate and an optional dopant, added in varying amounts so as to obtain dielectric powders having different Curie temperatures, and then combining two or more of these high dielectric constant lead magnesium niobate-based powders, high dielectric constant buried capacitors with an extended operating temperature range can be obtained. These dielectric powder mixtures that have varying Curie temperatures average or level off the temperature effect on their dielectric properties. These capacitors have a low temperature coefficient of capacitance as well.

DETAILED DESCRIPTION OF THE INVENTION

Figure 1:
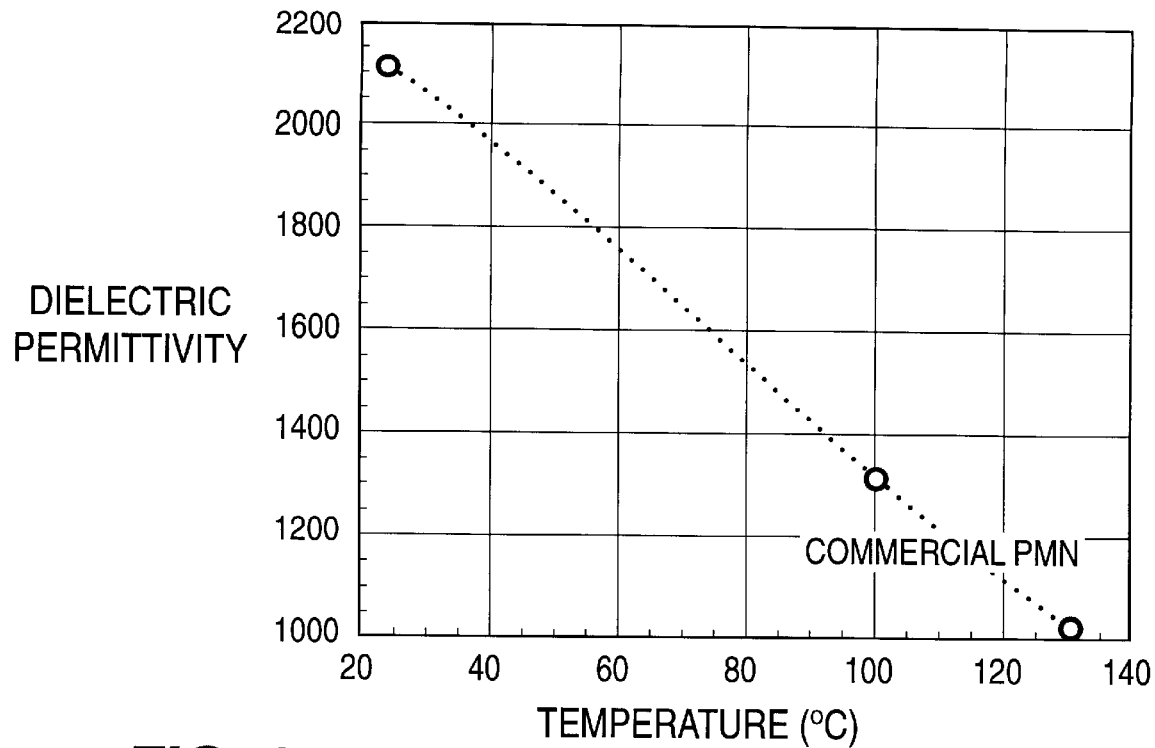
FIG. 1 is a graph of dielectric permittivity versus temperature of a thick film capacitor made from commercial PMN powders.

Capacitor ink formulations based on PMN dielectrics are known that have been mixed with a bismuth trioxide flux and a glass, together with a suitable organic vehicle so that the resultant capacitor ink can be screen printed onto a glass-based green tape. Alternatively, the above capacitor composition can be cast as a green tape layer by suitable adjustment of the organic vehicle. The capacitors are completed by screen printing silver electrodes on either side of the capacitor layer or green tape layer and electrically connecting the layers. These capacitors are sinterable below 900° C. These layers are connected together in parallel by means of suitable via fill inks. The capacitance of the multiple layer capacitors then add, permitting the formation of very high value capacitors. Their losses are very low.

Various mixtures of PMN and relaxor based ferroelectric powders were made having the following compositions. The compositions in molar percent, and their Curie temperatures are given below in Table I.

TABLE I

| Sample | Amount PMN | Amount $PbTiO_3$ | La | Tc(° C.) |
|---|---|---|---|---|
| 1 | 93 | 7 | — | +28 |
| 2 | 76.4 | 23.6 | 1 | +78 |
| 3 | 65 | 35 | — | +180 |
| 4 | 100 | — | — | −12 |

TABLE I-continued

| Sample | Amount PMN | Amount PbTiO$_3$ | La | Tc(° C.) |
|---|---|---|---|---|
| 5 | 65 | 35 | 1 | +155 |
| 6 | 100 | — | 1 | −28 |

Thus the Curie temperature of the powders varies widely on a low of −12° C. up to 180° C.

Mixtures of the above powders were made to vary the Curie temperature of the PMN powders. The results are given below in Table II, wherein parts are by weight.

TABLE II

| Mixture | Composition |
|---|---|
| A | Equal parts Samples 1 and 5 |
| B | Equal parts Samples 1, 2 and 3 |
| C | Equal parts of Samples 1 and 3 |
| D | Equal parts of Samples 1 and 2 |

Thick film capacitor inks were prepared from mixtures A to D in conventional manner, mixing at least two of the mixtures with a glass and an organic vehicle comprising a resin binder and a solvent. Equal parts of 10 parts each of two of the above mixtures were mixed with 1.154 parts of bismuth trioxide as a flux; 0.865 part of a low melt temperature glass comprising less than 2% by weight of BaO, over 5.0% by weight of boron oxide, over 70% by weight of lead oxide, less than 2.0% by weight of silica and over 12.0% by weight of zinc oxide; 0.44 part of Hypermer PS2, a dispersant of ICI Americas, Inc; and 6.25 parts of a resin-solvent mixture comprising 9.4 parts of ethyl cellulose having a molecular weight of 300, 18.8 parts of ethyl cellulose having a molecular weight of 14, 133 parts of butyl carbitol and 88.8 parts of dodecanol.

The Curie temperature and TCC of the thick film inks of the mixtures prepared as above are summarized in Table III below. TCC was measured in ppm/° C. over the temperature range of 25–130° C.

TABLE III

| Sample | Tc(° C.) | TCC |
|---|---|---|
| A | +10 | +1100 |
| B | NA | +960 |
| C | +140 | +650 |
| D | NA | −1500 |
| PMN | +10 | −5010 |

Buried or embedded capacitors were made by screen printing a capacitor ink onto a green tape stack on a metal support substrate one or two layers beneath the top of the stack. The capacitors were terminated by screen printing a conductive layer, such as silver, over and under the dielectric capacitor ink layer.

A suitable conductive ink is made from, in % by weight, 20.55% of silver powder, 61.64% of silver flake, available from the Degussa Corporation, 0.55% of the above glass, 0.16% of bismuth oxide flux, 2.06% of a dispersant, and a solvent of 50% lecithin in terpineol and 15.04% of the resin-solvent mixture described above for capacitor inks.

Capacitor test structures were made in three different sizes; 50 mil square, 100 mil square and 200 mil square. The samples were fired at a peak temperature of 915° C. for 30 minutes on a belt furnace.

Figure 3:
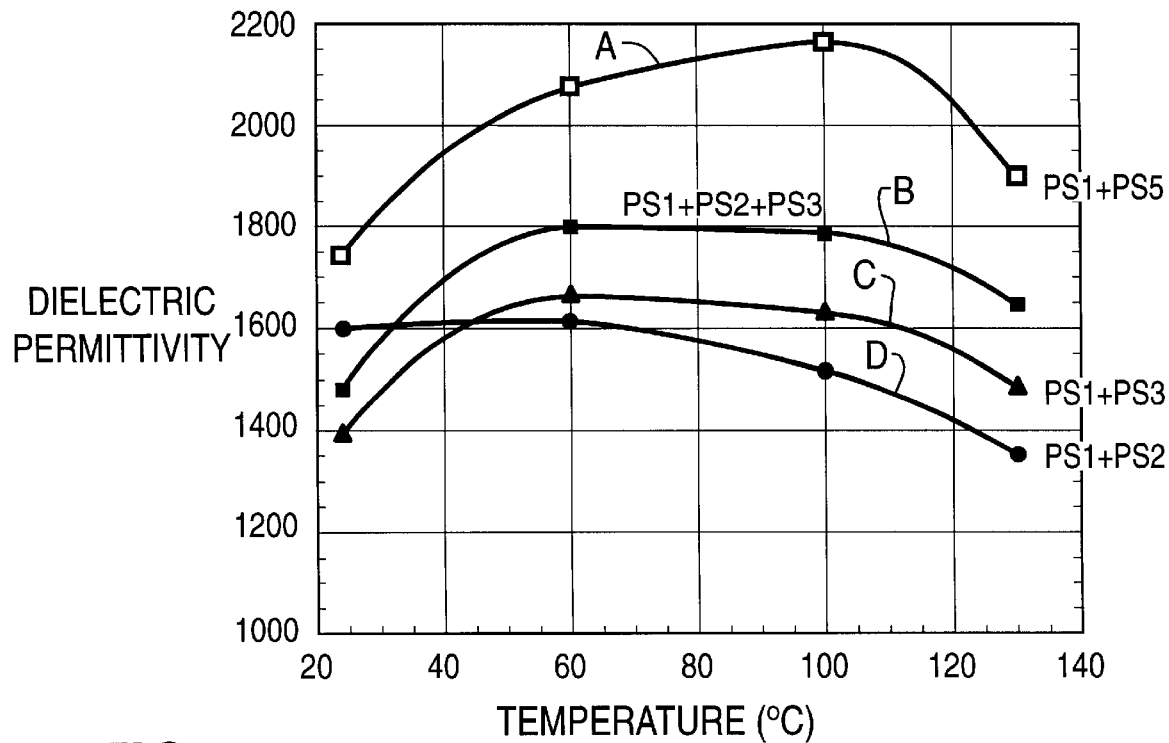
FIG. 3 is a graph of dielectric permittivity versus temperature of PMN-based powder mixtures of the invention.

FIG. 3 illustrates the variation in dielectric permittivity of the various mixtures A to D versus temperature.

Comparing the results with FIG. 1, it can be seen that the permittivity remains high for all of the mixtures to a temperature of at least 100° C.

Figure 2:
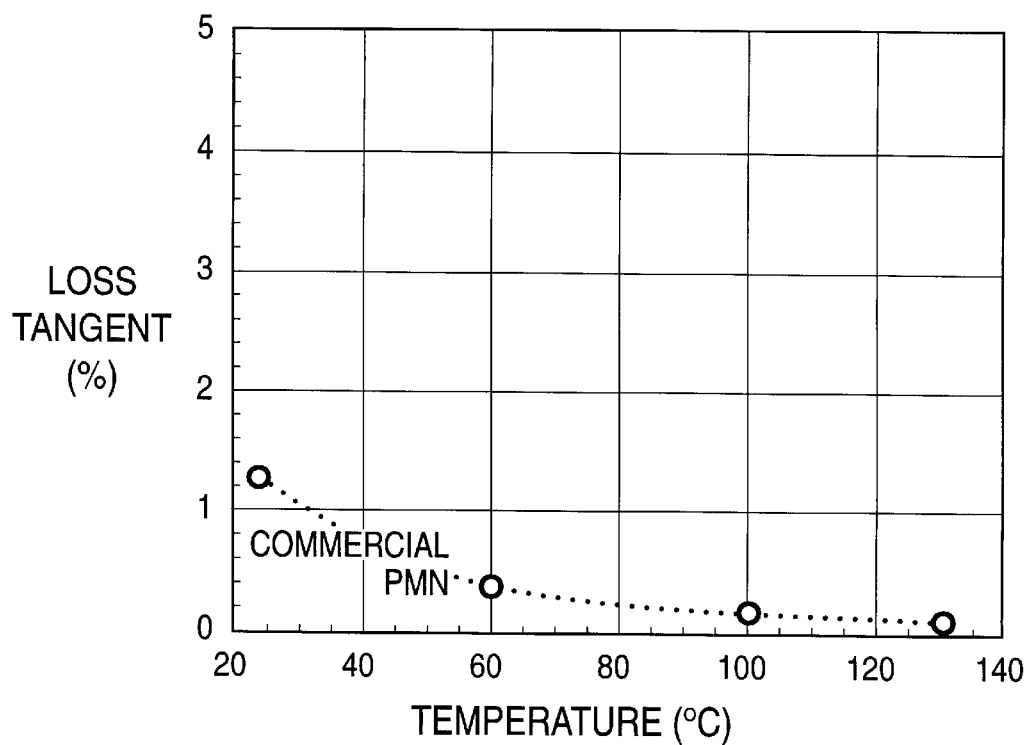
FIG. 2 is a graph of loss tangent versus temperature of a capacitor made from the commercially available PMN powder.
Figure 4:
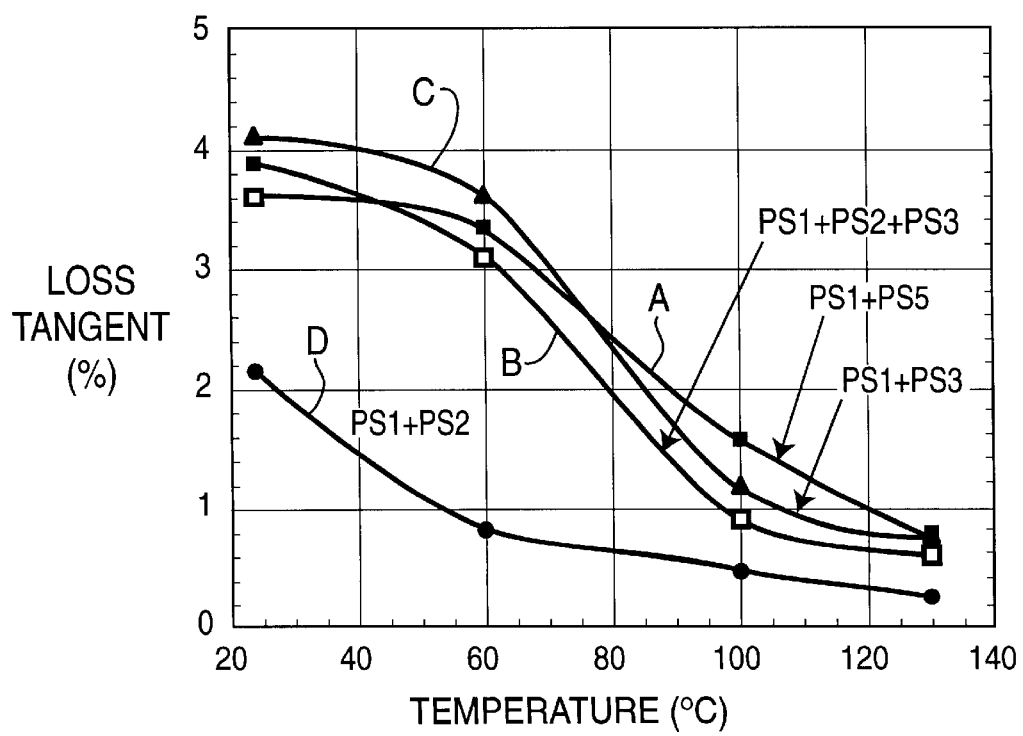
FIG. 4 is a graph of loss tangent versus temperature of PMN-based powder mixtures of the invention.

FIG. 4 illustrates the variation in % loss tangent of the mixtures A to D versus temperature. Comparing the results with FIG. 2, it is apparent that the loss tangents of the mixtures of the invention are all higher than that of PMN alone up to about 100° C.

Thus by combining a high Curie temperature powder and a lower Curie temperature powder, such as combinations of samples 1 and 2, 1 and 3, 1 and 5, or a combination of low, medium and high Curie temperature powders, the dielectric permittivity remains much higher up to higher temperatures and the temperature at which low loss tangent decreases is also higher, as compared to a commercial PMN powder. In all cases, a mixture of PMN and PbTiO$_3$ containing from about 98 to 50 molar percent of PMN and 2 to 50 molar percent of lead titanate work well. A small amount, up to about 5 molar percent, of a dopant can also be added to further adjust the Curie temperature. Suitable dopants include lanthanum, sodium, potassium, bismuth, antimony, ferric ion, aluminum, chromium and barium.

To make embedded capacitors, the capacitor inks can be screen printed onto green tapes particularly formulated for co-firing onto particular metal support substrates, as is known. A conductor ink is screen printed onto green tapes to form layers underlying and overlying the capacitor layer. These layers are aligned with a green tape stack and at least one green tape overlying the top conductor layer, to prevent damage to the conductor layer during the lamination step. The green tape stack can be adhered to a suitable metal support substrate. The laminated, supported green tape stack is then fired to devitrify the glass.

Although the invention has been described in terms of specific compositions and mixtures, the invention is not meant to be limited to the details described therein. The amounts and type of the various ingredients, compositions and mixtures can be varied as will be apparent to one skilled in the art. The invention is only meant to be limited by the scope of the appended claims.

What is claimed is:

1. A mixture of at least two high dielectric constant powders of lead magnesium niobate containing from about 2 to about 50 molar percent of a ferroelectric material, said dielectric powder mixtures having different Curie temperatures.

2. A mixture according to claim 1 wherein said ferroelectric material is lead titanate.

3. A mixture according to claim 1 wherein the dielectric powders includes up to 5 molar percent of a dopant selected from the group consisting of sodium, potassium, bismuth, antimony, ferric ion, aluminum, chromium, barium and lanthanum.

4. A capacitor ink comprising a mixture of at least two high dielectric constant powders of lead magnesium niobate containing from about 2 to about 50 molar percent of a ferroelectric material, said dielectric powder mixtures having different Curie temperatures, a flux, a lead-based glass and an organic vehicle.

5. A capacitor ink according to claim 4 wherein said ferroelectric material is lead titanate.

6. A capacitor ink according to claim 4 wherein the dielectric powders include up to 5 molar percent of a dopant selected from the group consisting of sodium, potassium, bismuth, antimony, ferric ion, aluminum, chromium, barium and lanthanum.

7. A capacitor ink according to claim 4 wherein the dopant is lanthanum.

8. A capacitor ink according to claim 4 wherein said first mixture contains about 7 molar percent of lead titanate and said second mixture contains about 35 molar percent of lead titanate.

9. A capacitor ink according to claim 4 wherein said first mixture contains about 7 molar percent of lead titanate, said second mixture contains about 35 molar percent of lead titanate, and a third mixture contains about 23.5 molar percent of lead titanate.

10. A capacitor ink according to claim 4 wherein said capacitor ink comprises a low melt temperature glass containing less than 2% by weight of barium oxide, over 5.0% by weight of boron oxide, less than 2.0% by weight of silica, over 12.0% by weight of zinc oxide and the remainder lead oxide.

11. An embedded capacitor having a high dielectric constant and low temperature coefficient of capacitance comprising
   a) a plurality of green tapes, each green tape having printed circuitry thereon;
   b) a dielectric layer of green tape having a conductive layer of silver thereon;
   c) one of more green tapes screen printed with a capacitor ink comprising a mixture of two or more dielectric powder mixtures of lead magnesium niobate, and a ferroelectric material, said mixtures having different Curie temperatures, a flux, a lead-based glass and an organic vehicle;
   d) a green tape layer having a conductive silver layer thereon; and
   e) an overlying dielectric green tape layer.

12. An embedded capacitor according to claim 11 wherein the green tapes are supported on a metal support substrate.

* * * * *